United States Patent [19]

Adam

[11] Patent Number: 4,894,447
[45] Date of Patent: Jan. 16, 1990

[54] SURFLONATED AZO DYES CONTAINING A DIAZO COMPONENT CONSISTING OF A TWO RING HETEROCYCLE WITH AN AMINOPHENYLENE GROUP

[75] Inventor: Jean-Marie Adam, Rosenau, France

[73] Assignee: Ciba-Geigy Corporation, Ardsley, N.Y.

[21] Appl. No.: 36,416

[22] Filed: Apr. 9, 1987

[30] Foreign Application Priority Data

Apr. 16, 1986 [CH] Switzerland ............... 1521/86-3

[51] Int. Cl.$^4$ ............... C09B 29/033; C09B 29/33; C09B 29/50; C09B 29/52
[52] U.S. Cl. ............... 534/775; 534/573; 534/583; 534/728; 534/737; 534/741; 548/224
[58] Field of Search ............... 534/728, 741, 775, 800

[56] References Cited

U.S. PATENT DOCUMENTS

| | | | |
|---|---|---|---|
| 1,159,386 | 11/1914 | Huismann ............... | 534/741 |
| 2,657,202 | 10/1953 | Moser ............... | 534/741 |
| 3,274,171 | 9/1966 | Anderson et al. ............... | 534/741 |
| 3,426,010 | 2/1969 | Dunworth ............... | 534/775 |
| 3,579,498 | 5/1971 | Dunworth ............... | 534/775 X |
| 3,726,851 | 4/1973 | Litke ............... | 534/775 |
| 3,862,116 | 1/1975 | Toji ............... | 534/565 X |
| 4,001,206 | 1/1977 | Schoefberger ............... | 534/741 |
| 4,071,312 | 1/1978 | Blackwell ............... | 534/775 X |
| 4,254,026 | 3/1981 | Bauer et al. ............... | 534/565 X |
| 4,285,861 | 8/1981 | Brode et al. ............... | 534/775 X |

FOREIGN PATENT DOCUMENTS

| | | | |
|---|---|---|---|
| 183151 | 6/1986 | European Pat. Off. ............ | 534/775 |
| 2604947 | 8/1976 | Fed. Rep. of Germany ...... | 534/800 |
| 3434922 | 4/1986 | Fed. Rep. of Germany ...... | 534/775 |
| 3434923 | 4/1986 | Fed. Rep. of Germany ...... | 534/775 |
| 3443595 | 5/1986 | Fed. Rep. of Germany ...... | 534/775 |
| 61-98768 | 5/1986 | Japan ............... | 534/800 |
| 1333023 | 10/1973 | United Kingdom ............... | 534/775 |

*Primary Examiner*—Floyd D. Higel
*Attorney, Agent, or Firm*—Edward McC. Roberts; Meredith C. Findlay

[57] ABSTRACT

Azo dyes of the formula

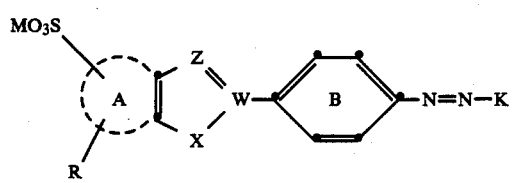

or tautomeric forms thereof, in which:

Z is N or CH,
X is O, $NR_1$ or N,
W is N or C,
K is a coupling component,
R is hydrogen, $C_1$–$C_6$-alkyl, $C_1$–$C_4$-alkoxy, halogen, nitro, —CN, —$NHR_1$, —NH-acyl, phenoxy, —COOH, $COOR_1$, —$CONHR_1$ or substituted or unsubstituted phenyl, $R_1$ being hydrogen, substituted or unsubstituted $C_1$–$C_6$-alkyl or substituted or unsubstituted phenyl,
M is H$^\oplus$, Li$^\oplus$, Na$^\oplus$, K$^\oplus$, $NH_4^\oplus$ or the protonated form of a $C_4$–$C_{12}$-trialkylamine, of a $C_4$–$C_{12}$-diamine or of a $C_2$–$C_{12}$-alkanolamine,
A is a carbocyclic or nitrogen-containing aromatic radical which can be further substituted, and
B is a 1,4-phenylene radical which can be further substituted.

The present invention relates to azo dyes, the preparation of these azo dyes by diazotizing the corresponding amine and to the use of these dyes for dyeing textile materials, leathers, inks and in particular paper.

16 Claims, No Drawings

SURFLONATED AZO DYES CONTAINING A DIAZO COMPONENT CONSISTING OF A TWO RING HETEROCYCLE WITH AN AMINOPHENYLENE GROUP

The present invention relates to novel azo dyes, to the preparation thereof and to the use thereof for dyeing textile materials, leathers, inks and in particular paper.

The present invention provides azo dyes of the formula

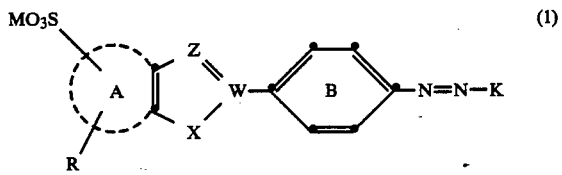    (1)

or tautomeric forms thereof, in which:

Z is N or CH,
X is O, $NR_1$ or N,
W is N or C,
K is a coupling component,
R is hydrogen, $C_1$–$C_6$-alkyl, $C_1$–$C_4$-alkoxy, halogen, nitro, —CN, —$NHR_1$, —NH-acyl, phenoxy, —COOH, $COOR_1$, —$CONHR_1$ or substituted or unsubstituted phenyl, $R_1$ being hydrogen, substituted or unsubstituted $C_1$–$C_6$-alkyl or substituted or unsubstituted phenyl,
M is $H^\oplus$, $Li^\oplus$, $Na^\oplus$, $K^\oplus$, $NH_4^\oplus$ or the protonated form of a $C_4$–$C_{12}$-trialkylamine, of a $C_4$–$C_{12}$-diamine or of a $C_2$–$C_{12}$-alkanolamine,
A is a carbocyclic or nitrogen-containing aromatic radical which can be further substituted, and
B is a 1,4-phenylene radical which can be further substituted.

A coupling component K can be any coupling component customary in azochemistry and known from the literature in the field.

Examples selected from the large number of possibilities are: coupling components of the benzene series, of the naphthalene series, of open-chain active methylene compounds (e.g. the acylacetarylamides) and of the heterocyclic series.

Examples of said radicals of coupling components K are radicals from the series of the acylacetarylamides, phenols, pyridones, quinolines, pyrazoles, indoles, diphenylamines, anilines, aminopyridines, pyrimidines, pyrimidones, naphthols, naphthylamines, aminothiazoles, thiophenes or hydroxypyridines.

Particularly preferred coupling components are pyrimidines, acetoacetarylamides and pyrazoles.

The pyrimidines are in particular compounds of the formula

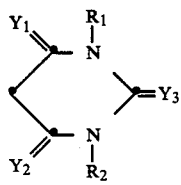    (2)

in which $Y_1$ and $Y_2$ are independently of each other =O, =NH or =N—$C_1$–$C_6$-alkyl,
$Y_3$ is =O, =S, =$NR_1$ or =N—CN and
$R_1$ and $R_2$ are independently of each other hydrogen, substituted or unsubstituted $C_1$–$C_6$-alkyl or substituted or unsubstituted phenyl.

A substituted or unsubstituted $C_1$–$C_6$-alkyl group $R_1$ and/or $R_2$ is to be understood as meaning, as generally in this application, for example a methyl, ethyl, n- or iso-propyl, n-, sec.- or tert.-butyl, a straight-chain or branched pentyl or hexyl or a cyclohexyl radical which can be monosubstituted or polysubstituted, for example by —OH, $C_1$–$C_4$-alkoxy or $C_1$–$C_4$-hydroxyalkoxy.

Examples of suitable substituted $C_1$–$C_6$-alkyl radicals are: methoxymethyl, ethoxymethyl, ethoxyethyl, ethoxypropyl, n-propoxymethyl, iso-propoxymethyl, butoxymethyl, butoxyethyl, butoxypropyl, ethoxypentyl, methoxybutyl, ethoxypentyl and 2-hydroxyethoxypentyl.

Substituted or unsubstituted phenyl $R_1$ and/or $R_2$ can be unsubstituted phenyl or phenyl which is monosubstituted or polysubstituted by identical or different radicals. Such radicals are for example: $C_1$–$C_4$-alkyl which in general is to be understood as meaning in this application methyl, ethyl, n- or iso-propyl or n-, sec.- or tert.-butyl, $C_1$–$C_4$-alkoxy, which in this application generally includes methoxy, ethoxy, n- or iso-propoxy or n-, sec.- or tert.-butoxy, halogen such as fluorine, chlorine or bromine, nitro or sulfo.

A phenyl $R_1$ and/or $R_2$ is preferably a phenyl which is unsubstituted or substituted by 1 to 3 $C_1$–$C_4$-alkyl, chlorine or methoxy groups, in particular the meaning unsubstituted phenyl being preferred.

$R_1$ and/or $R_2$ are preferably hydrogen or $C_1$–$C_4$-alkyl and particularly preferably hydrogen.

$Y_1$ and/or $Y_2$ are preferably the functional group =O or =NH, it being preferred in addition that $Y_1$ and $Y_2$ are identical. $Y_1$ and $Y_2$ are particularly preferably identical and are each =O.

In the case of $Y_3$ being =$NR_1$, $R_1$ is subject to the abovementioned definitions and preferences.

$Y_3$ is preferably the group =O, =NH or =N—CN and particularly preferably the group =O.

In a particularly preferred embodiment of the azo dyes according to the invention, $Y_1$, $Y_2$ and $Y_3$ are each =O.

An acetoacetarylamide coupling component K is in particular a compound of the formula

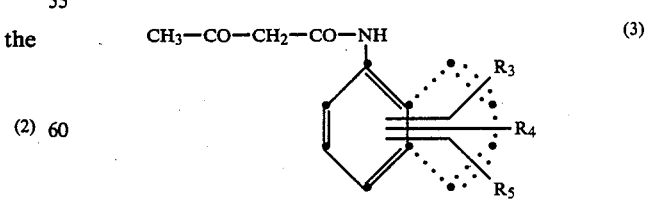    (3)

in which $R_3$, $R_4$ and $R_5$ are each independently of one another hydrogen, $C_1$–$C_4$ alkyl, $C_1$–$C_4$ alkoxy, chlorine, bromine, nitro or sulfo.

A pyrazole coupling component K preferably conforms to the formula

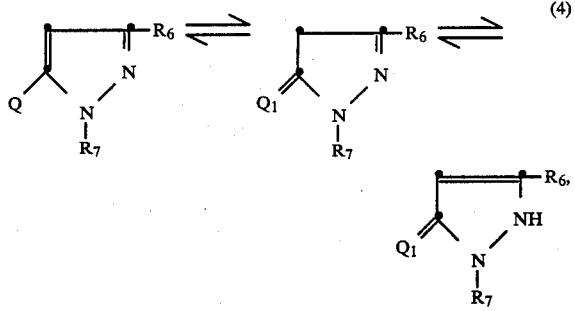

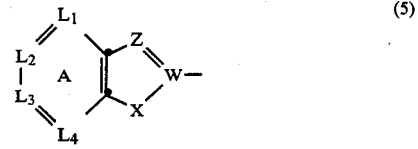

in which Q is OH or NH$_2$, Q$_1$ is O or NH, R$_7$ is H, C$_1$–C$_4$-alkyl, alkenyl, cycloalkyl, aryl, in particular phenyl, benzyl or phenylethyl and R$_6$ is R$_7$ or COOR$_7$ or CONHR$_7$.

In the dyes of the formula (1), R is hydrogen, C$_1$–C$_6$-alkyl, C$_1$–C$_4$-alkoxy, halogen, nitro, CN, —NHR$_1$, —NH-acyl, phenoxy, —COOH, —CONHR$_1$ or substituted or unsubstituted phenyl, 1 to 3 of these radicals, which can be identical or different, being present.

If R is a radical —NHR$_1$ or —CONHR$_1$, R$_1$ is subject to the abovementioned definitions and preferences.

If R is —NH-acyl, the acyl radical can be for example a C$_2$–C$_6$-alkanoyl or benzoyl radical. Examples of suitable C$_2$–C$_6$-alkanoyl radicals are acetyl, propionyl, butyryl, isobutyryl, valeryl, isovaleryl or pivaloyl.

The benzoyl can be further substituted in the manner described above for phenyl.

Preferably an —NH-acyl R is —NH—C$_1$–C$_4$-alkanoyl or —NH-benzoyl which is unsubstituted or substituted by 1 to 3 C$_1$–C$_4$-alkyl, chlorine or methoxy groups.

A phenoxy R can be unsubstituted or further substituted in the manner described above for phenyl; preferably the phenoxy is not further substituted here.

R is preferably hydrogen, C$_1$–C$_4$-alkoxy, acylamino, C$_1$–C$_6$-alkyl or sulfophenyl.

Particularly preferred meanings of R are hydrogen, C$_1$–C$_4$-alkoxy or C$_1$–C$_4$-alkyl.

In a particularly preferred embodiment of the azo dyes according to the invention, R is hydrogen or methyl.

In an —NR$_1$— X, R$_1$ is subject to the abovementioned definitions and preferences.

Preferably X is N and particularly preferably O.

Z is preferably N.

The preferred meaning of W is C or, if Z and X are N, N.

A fused-on aromatic radical A can be for example a benzene, naphthalene, anthracene, phenanthrene or triphenylene radical which can each be further substituted not only by SO$_3$M and R but also by the customary substituents.

Customary substituents are to be understood as meaning in this context, for example, halogen such as fluorine, bromine and in particular chlorine, nitro, —CN, C$_1$–C$_4$-alkoxy or C$_1$–C$_4$-alkyl.

Preferably A is a benzene or naphthalene radical which can be further substituted and in particular is preferably a benzene radical which has no substituents other than —SO$_3$M and R.

A fused-on nitrogen-containing heterocyclic radical A is for example a quinoline radical and in particular a pyridine radical. In a pyridine radical A, the N-atom can be disposed in any of the four conceivable positions, L$_1$, L$_2$, L$_3$ or L$_4$ in the structural element of the azo dyes which is depicted below while the other three positions are occupied by C atoms, and X, W and Z are as defined above. Preferably the N atom occupies the position L$_1$ in the structural element shown above.

A heterocyclic nitrogen-containing radical and in particular a pyridine radical A can be further substituted by the customary substituents, for example halogen, C$_1$–C$_4$-alkyl or C$_1$–C$_4$-alkoxy, but preferably carries no further substituents other than —SO$_3$M and R.

In the preferred azo dyes of formula (1), A is defined as a benzene or pyridine radical which can be further substituted. Particularly preferably the benzene or pyridine radical is not further substituted.

Particularly preferably A is defined as a benzene radical which is not further substituted.

In a preferred embodiment of the azo dyes according to the invention, A is a benzene radical which is not further substituted, X is O, Z is —N= and R is hydrogen.

The 1,4-phenylene radical B can be monosubstituted or polysubstituted by the customary substituents such as sulfo, C$_1$–C$_4$-alkyl, C$_1$–C$_4$-alkoxy, halogen such as fluorine, chlorine, bromine, nitro or —CN. Preferably B is an unsubstituted or chlorine-, methyl- or in particular sulfo-substituted 1,4-phenylene radical; particularly preferably B is a 1,4-phenylene radical which is not further substituted.

A protonated C$_4$–C$_{12}$-trialkylamine M can be for example protonated N-ethyldimethylamine, N,N-diethylmethylamine, tri-n-propylamine, tri-n-butylamine, tri-isobutylamine and in particular triethylamine or tri-isopropylamine; mixtures of various protonated amines are also suitable.

A protonated C$_4$–C$_{12}$-diamine M is for example an ethylenediamine or 1,3-diaminopropane where one or both N atoms are additionally substituted by one or two C$_1$–C$_4$-alkyl radicals, preferably methyl or ethyl radicals. M is here preferably an N,N-dialkylethylenediamine or N,N-dialkyl-1,3-diaminopropane. Examples are: N-ethylethylenediamine, N,N-dimethylethylenediamine, N,N'-dimethylethylenediamine, N,N-diethylethylenediamine, 3-dimethylamino-1-propylamine or 3-diethylamino-1-propylamine.

A protonated C$_2$–C$_{12}$-alkanolamine M can be for example the protonated form of a monoalkanolamine, dialkanolamine, monoalkanoldialkylamine, dialkanolalkylamine or trialkanolamine or a mixture of various protonated alkanolamines. Examples are protonated 2-aminoethanol, di-(2-hydroxyethyl)-amine, N-(2-hydroxyethyl)-dimethylamine, N-(2-hydroxyethyl)-diethylamine, N,N-di-(2-hydroxyethyl)-methylamine, N,N-di-(2-hydroxyethyl)-ethylamine or tri-(2-hydroxyethyl)-amine, 2-aminoethoxyethanol or diethylaminopropylamine.

Preferably M is Na$^\oplus$, Li$^\oplus$ or protonated C$_4$–C$_6$-alkanolamine, of the C$_4$–C$_6$-alkanolamines preference being given to tri-(2-hydroxyethyl)-amine, di-(2-hydroxyethyl)-amine or a mixture of these two amines.

A preferred embodiment of the invention relates to azo dyes of the formula (1) in which R is hydrogen, $C_1$-$C_4$-alkyl or $C_1$-$C_4$-alkoxy, X is O or N, Z is N, and K is a radical of the formula (2) where $R_1$ and $R_2$ are independently of each other hydrogen or $C_1$-$C_4$-alkyl, $Y_1$ and $Y_2$ are identical and are each =O or =NH, $Y_3$ is =O, =NH or =N—CN, M is $H^\oplus$, $Na^\oplus$, $K^\oplus$, $NH_4^\oplus$ or protonated $C_2$-$C_6$-alkanolamine, A is a benzene radical and B is a 1,4-phenylene radical which is unsubstituted or substituted by sulfo, chlorine, methoxy or methyl.

In a particularly preferred embodiment of the azo dyes of the formula (1) R is hydrogen, $C_1$-$C_4$-alkyl or $C_1$-$C_4$-alkoxy, X is O, W is CH, Z is N and K is a radical of the formula (2) where $R_1$ and $R_2$ are H, $Y_1$ and $Y_2$ are each =O and $Y_3$ is =O or =N—CN, M is $Li^\oplus$, $Na^\oplus$ or protonated $C_4$-$C_6$-alkanolamine, A is a benzene radical and B is a 1,4-phenylene radical which is not further substituted.

Particular preference is given to azo dyes of the formula

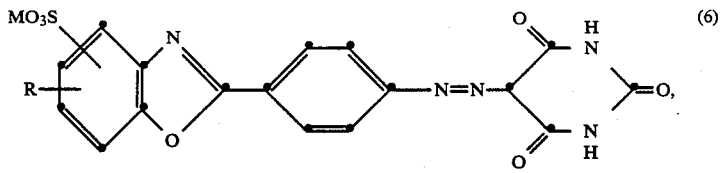

in which M and R have the abovementioned meanings and preferences.

The preparation of the azo dyes of formula (1) is performed in a manner known per se, for example by diazotizing an amine of formula

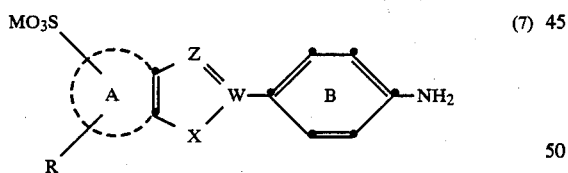

and reacting with a coupling component HK, the symbols R, M, X, W, Z, A, B and K being subject to abovementioned definitions and preferences.

The compounds of the formula (7) are novel and constitute a further part of the subject matter of the present invention. Preference is given to the compounds of the formulae

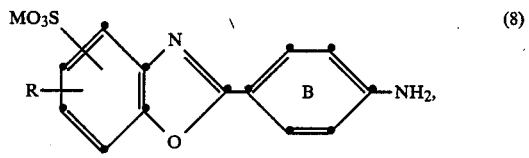

and

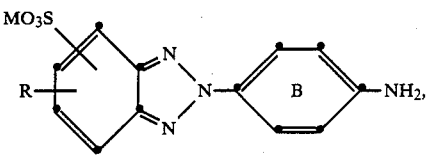

in which
R is hydrogen, $C_1$-$C_4$-alkyl, $C_1$-$C_4$-alkoxy, halogen, nitro, CN, —$NHR_1$, —NH-acyl, phenoxy, —COOH, —$CONHR_1$, or substituted or unsubstituted phenyl and
M is $H^\oplus$, $Li^\oplus$, $Na^\oplus$, $K^\oplus$, $NH_4^\oplus$ or the protonated form of a $C_4$-$C_{12}$-trialkylamine, of a $C_4$-$C_{12}$-diamine or of a $C_2$-$C_{12}$-alkanolamine and the ring B can be further substituted.

The compounds (7), (8) and (9) are obtained analogously to methods of preparation known per se. In these compounds, the substituents —$SO_3M$ and R, depending on their nature and desired position in the molecule, either are already present in the corresponding starting material or are only introduced subsequently.

Preferably the compounds of the formula (7) are obtained by sulfonating the corresponding compounds of the formula

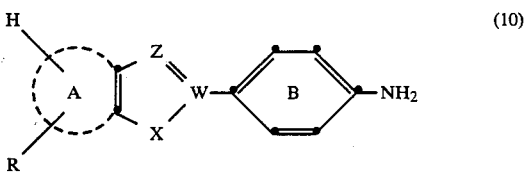

The sulfonation takes place under conditions known per se, for example by treating in 10 to 65% oleum at a temperature between about 0° and 80° C., preferably by treating in 15 to 30% oleum and 15° to 40° C.

However, the compounds of the formula (7) can also be obtained by starting in the synthesis of the heterocyclic 5-ring which has the groups Z, W, and X from a compound which already contains a sulfo group in the ring A.

The coupling components HK are known or can be prepared by methods known per se. The diazotization and coupling reactions are likewise known and take place under customary conditions.

The cation M derived in each case is introduced into the azo dyes of formula (1) for example by adding the diazonium salt of the amine of formula (7), after isolation and clarification, for example by filtration and washing, to an aqueous mixture which contains the coupling component and a basic lithium, sodium, potassium or ammonium salt or hydroxide, a $C_4$-$C_{12}$-trialkylamine or $C_2$-$C_{12}$-alkanolamine or mixtures of various alkylamines or alkanolamines.

The novel compounds of the formula (1) find utility in particular as dyes for dyeing and printing textile materials, paper, leather and for preparing inks.

If the azo dyes according to the invention are used for dyeing and printing textile materials, these textile materials can be for example made of cotton, wool, silk or polyamide materials. The novel dyes have high substantivity on these materials, a high degree of exhaustion and a high build-up, and the dyeings obtained have good fastness properties, in particular good wet fastness and light fastness properties.

The preferred use of the dyes according to the invention of the formula I lies in the application for dyeing and printing paper of any kind, in particular bleached and sized lignin-free paper.

The dyes according to the invention have very high substantivity on these substrates, the waste water remaining virtually colorless even in the case of deep shades (of up to over 1/1 RT=standard depth), which is an eminent technical and ecological advantage. The high degree of exhaustion is also advantageous for a high reproducibility of shade. The dyeings are wet-fast, i.e. they do not tend to bleed when dyed paper in the wet state is brought into contact with moist white paper. This property is particularly desirable for so-called "tissues", in the case of which it is foreseeable that the dyed paper will come into contact in the wet state (for example soaked with water, alcohol, surfactant solution etc.) with other surfaces such as textiles, paper and the like which need to be protected from staining.

The yellow to greenish yellow dyeings are brilliant and have very good fastness properties, in particular light fastness.

The dyes of the formula I further serve for dyeing leather materials by the various application methods, such as spraying, brushing and dipping, and for preparing inks of any kind, as for ballpoint pens and printing inks.

The following Examples illustrate the invention without limiting it thereto. The temperatures are given in degrees Celsius. Parts (p) and % ages are by weight.

EXAMPLE 1:

(a) 137 parts of 4-aminobenzoic acid and 110 parts of 2-aminophenol are introduced into 2000 parts of polyphosphoric acid and the mixture is maintained at 200° C. for 30 minutes. The reaction mixture is then poured onto ice, and the amine of the formula

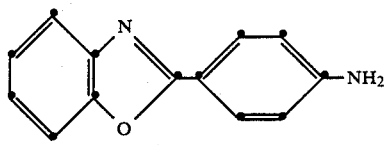

precipitates. The product is filtered off with suction, washed with water and dried.

(b) 105 parts of the product obtained as described in (a) are dissolved in 625 parts of sulfuric acid monohydrate, and 230 parts of 65% oleum are added. This is followed by stirring at room temperature for 15 hours and subsequently pouring onto ice. The precipitated reaction product of the formula

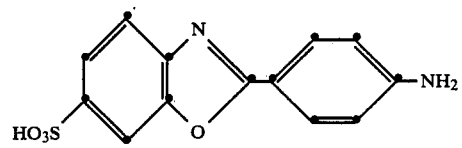

is filtered off with suction, washed with water and dried.

(c) 9.0 parts of the 2-(4-aminophenyl)-benzoxazol-6-sulfonic acid obtained under (b) are dissolved in 200 parts of water with a little aqueous sodium hydroxide solution, and 8 parts of 4N sodium nitrite solution are added. This solution is diazotized at 0° to 5° C. with 8 parts of concentrated hydrochloric acid. The suspension of the diazo compound is then added dropwise to a mixture consisting of 4 parts of barbituric acid, 8 parts of 30% sodium hydroxide solution and 100 parts of water.

The dye of the formula

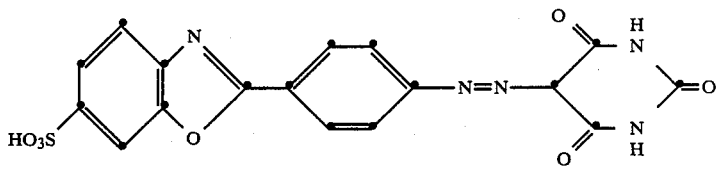

is salted out with 20 parts of sodium chloride, filtered off with suction and dried; it is very readily soluble in water and dyes paper in brilliant greenish yellow shades having very good fastness properties (in particular light fastness) and has an excellent build-up.

EXAMPLES 2–78

Example 1(c) is repeated, except that the diazo components listed in the table below under (A) and the coupling components under (B) are used, affording azo dyes which dye paper to a high fastness level in the shades recorded in the last column.

| Example No. | A | B | Shade on Paper |
|---|---|---|---|
| 2 | HO₃S-benzoxazole-C₆H₄-NH₂ | cyclic imide structure with O=C-NH-C(=O)-CH-C(=O)-NH | greenish yellow |
| 3 | H₃C-, SO₃H-benzoxazole-C₆H₄-NH₂ | " | greenish yellow |
| 4 | SO₃H, H₃C, H₃C-benzoxazole-C₆H₄-NH₂ | " | yellow |
| 5 | SO₃H, H₃C, CH₃-benzoxazole-C₆H₄-NH₂ | " | greenish yellow |
| 6 | CH₃CONH-, SO₃H-benzoxazole-C₆H₄-NH₂ | " | yellow |
| 7 | C₂H₅O-, SO₃H-benzoxazole-C₆H₄-NH₂ | " | yellow |
| 8 | SO₃H, H₃C-, (CH₃)₃C-benzoxazole-C₆H₄-NH₂ | " | greenish yellow |

| Example No. | A | B | Shade on Paper |
|---|---|---|---|
| 9 | [benzoxazole with C(CH3)3, CH3, SO3H substituents, linked to phenyl-NH2] | [barbituric acid type structure] | greenish yellow |
| 10 | [biphenyl-benzoxazole-phenyl-NH2 with HO3S] | " | yellow |
| 11 | [benzimidazole with SO3H, linked to phenyl-NH2] | " | yellow |
| 12 | [benzotriazole with SO3H, linked to phenyl-NH2] | " | greenish yellow |
| 13 | [benzofuran with HO3S, linked to phenyl-NH2] | " | orange |
| 14 | [benzoxazole with HO3S, linked to phenyl-NH2] | [cyanimino barbituric acid derivative] | greenish yellow |
| 15 | [benzoxazole with HO3S, linked to phenyl-NH2] | " | greenish yellow |
| 16 | [benzoxazole with H3C and SO3H, linked to phenyl-NH2] | [cyanimino barbituric acid derivative] | greenish yellow |

-continued

| Example No. | A | B | Shade on Paper |
|---|---|---|---|
| 17 | 5,6-dimethyl-4-SO₃H benzoxazole-2-(4-aminophenyl) | " | yellow |
| 18 | 5,7-dimethyl-4-SO₃H benzoxazole-2-(4-aminophenyl) | " | yellow |
| 19 | 6-CH₃CONH-4-SO₃H benzoxazole-2-(4-aminophenyl) | " | yellow |
| 20 | 6-C₂H₅O-4-SO₃H benzoxazole-2-(4-aminophenyl) | " | yellow |
| 21 | 5-CH₃-7-C(CH₃)₃-4-SO₃H benzoxazole-2-(4-aminophenyl) | " | yellow |
| 22 | 5-C(CH₃)₃-7-CH₃-4-SO₃H benzoxazole-2-(4-aminophenyl) | " | yellow |
| 23 | 6-(4-HO₃S-phenyl)benzoxazole-2-(4-aminophenyl) | HO–C(=NH)–CH=C(CH₃)–N(CN)–C(=O)–NH (coupling component) | yellow |

-continued

| Example No. | A | B | Shade on Paper |
|---|---|---|---|
| 24 | benzimidazole with HO3S and 4-aminophenyl substituent (NH in ring) | " | yellow |
| 25 | benzotriazole with SO3H and 4-aminophenyl substituent | " | greenish yellow |
| 26 | benzofuran with HO3S and 4-aminophenyl substituent | " | orange |
| 27 | benzoxazole with HO3S and 4-aminophenyl substituent | melamine (2,4,6-triamino-1,3,5-triazine) | yellow |
| 28 | benzoxazole with HO3S (different position) and 4-aminophenyl substituent | " | yellow |
| 29 | benzoxazole with H3C and SO3H, 4-aminophenyl substituent | " | yellow |
| 30 | benzoxazole with SO3H, two H3C groups, 4-aminophenyl substituent | melamine | yellow |
| 31 | benzoxazole with SO3H, H3C (two positions), 4-aminophenyl substituent | " | yellow |

-continued

| Example No. | A | B | Shade on Paper |
|---|---|---|---|
| 32 | 6-(CH₃CONH), 4-(SO₃H)-benzoxazol-2-yl-(4-aminophenyl) | " | yellow |
| 33 | 6-(C₂H₅O), 4-(SO₃H)-benzoxazol-2-yl-(4-aminophenyl) | " | yellow |
| 34 | 4-(SO₃H), 5-CH₃, 7-C(CH₃)₃-benzoxazol-2-yl-(4-aminophenyl) | " | yellow |
| 35 | 4-(SO₃H), 5-C(CH₃)₃, 7-CH₃-benzoxazol-2-yl-(4-aminophenyl) | " | yellow |
| 36 | 6-(4-HO₃S-phenyl)-benzoxazol-2-yl-(4-aminophenyl) | " | yellow |
| 37 | 6-HO₃S-benzimidazol-2-yl-(4-aminophenyl) | H₂N–C(=N–)–NH₂ with H₂N–C(=N–) (melamine-type) | yellow |
| 38 | 4-SO₃H-benzotriazol-2-yl-(4-aminophenyl) | " | yellow |

-continued

| Example No. | A | B | Shade on Paper |
|---|---|---|---|
| 39 | HO3S-[benzene ring]-CH=[with O bridge]-[benzene]-NH2 | " | orange |
| 40 | HO3S-[benzoxazole]-[benzene]-NH2 | OCH3, NH-CO-CH2-CO-CH3, SO3H, CH3 substituted benzene | greenish yellow |
| 41 | HO3S-[benzoxazole]-[benzene]-NH2 | " | greenish yellow |
| 42 | H3C-[benzoxazole with SO3H]-[benzene]-NH2 | " | greenish yellow |
| 43 | H3C, H3C, SO3H-[benzoxazole]-[benzene]-NH2 | " | greenish yellow |
| 44 | SO3H, H3C, CH3-[benzoxazole]-[benzene]-NH2 | OCH3, NH-CO-CH2-CO-CH3, SO3H, CH3 substituted benzene | greenish yellow |
| 45 | CH3CONH-[benzoxazole with SO3H]-[benzene]-NH2 | " | greenish yellow |
| 46 | C2H5O-[benzoxazole with SO3H]-[benzene]-NH2 | " | greenish yellow |

-continued
| Example No. | A | B | Shade on Paper |
|---|---|---|---|
| 47 | 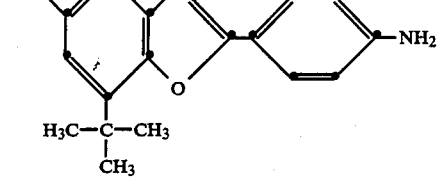 | " | greenish yellow |
| 48 | 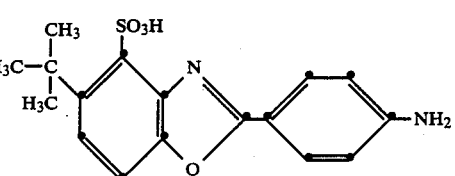 | | greenish yellow |
| 49 | 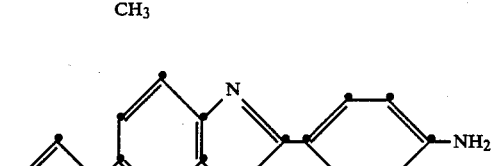 | " | greenish yellow |
| 50 | 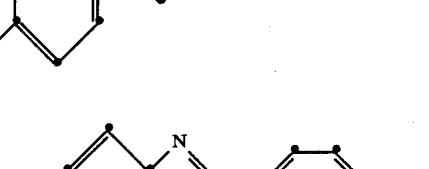 | " | greenish yellow |
| 51 | 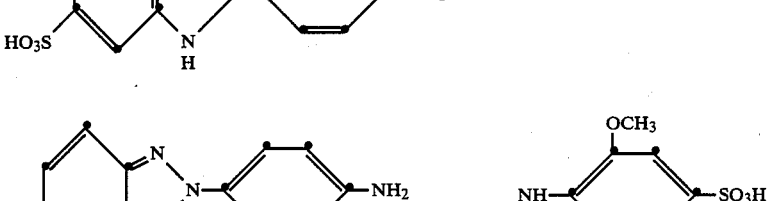 | 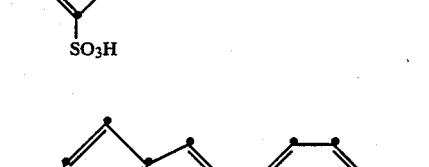 | greenish yellow |
| 52 | | " | greenish yellow |
| 53 | 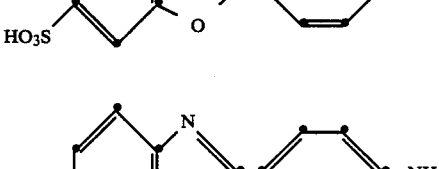 | | reddish yellow |

-continued

| Example No. | A | B | Shade on Paper |
|---|---|---|---|
| 54 | CH₃CONH-[benzoxazole with SO₃H]-C₆H₄-NH₂ | " | reddish yellow |
| 55 | H₃C-[benzoxazole with SO₃H]-C₆H₄-NH₂ | " | reddish yellow |
| 56 | (H₃C)₂-[benzoxazole with SO₃H]-C₆H₄-NH₂ | " | reddish yellow |
| 57 | H₃C-[benzoxazole with SO₃H and CH₃]-C₆H₄-NH₂ | " | reddish yellow |
| 58 | CH₃CONH-[benzoxazole with SO₃H]-C₆H₄-NH₂ | 3-methyl-5-hydroxy-pyrazole (HO, CH₃, NH) | reddish yellow |
| 59 | C₂H₅O-[benzoxazole with SO₃H]-C₆H₄-NH₂ | " | reddish yellow |
| 60 | H₃C-[benzoxazole with SO₃H and C(CH₃)₃]-C₆H₄-NH₂ | " | reddish yellow |

-continued

| Example No. | A | B | Shade on Paper |
|---|---|---|---|
| 61 | 4-methyl-6-tert-butyl-benzoxazole-7-sulfonic acid linked to 4-aminophenyl | " | reddish yellow |
| 62 | 5-(4-sulfophenyl)-benzoxazol-2-yl linked to 4-aminophenyl | " | reddish yellow |
| 63 | 5-sulfo-benzimidazol-2-yl linked to 4-aminophenyl | " | reddish yellow |
| 64 | 5-sulfo-benzotriazol-2-yl linked to 4-aminophenyl | " | reddish yellow |
| 65 | 5-sulfo-benzofuran-2-yl linked to 4-aminophenyl | 3-methyl-5-hydroxy-pyrazole (HO, NH) | orange |
| 66 | 6-sulfo-benzoxazol-2-yl linked to 4-aminophenyl | 2-methoxy-5-(acetoacetylamino)phenyl (NH—CO—CH$_2$—CO—CH$_3$, OCH$_3$) | greenish yellow |
| 67 | 4-sulfo-benzoxazol-2-yl linked to 4-aminophenyl | " | greenish yellow |
| 68 | 5-methyl-7-sulfo-benzoxazol-2-yl linked to 4-aminophenyl | " | greenish yellow |

-continued

| Example No. | A | B | Shade on Paper |
|---|---|---|---|
| 69 | 5,6-dimethyl-4-sulfo-benzoxazol-2-yl-(4-aminophenyl) | " | greenish yellow |
| 70 | 5,7-dimethyl-4-sulfo-benzoxazol-2-yl-(4-aminophenyl) | " | greenish yellow |
| 71 | 6-acetamido-7-sulfo-benzoxazol-2-yl-(4-aminophenyl) | " | greenish yellow |
| 72 | 5-ethoxy-7-sulfo-benzoxazol-2-yl-(4-aminophenyl) | 2-methoxy-phenyl-NH-CO-CH$_2$-CO-CH$_3$ | greenish yellow |
| 73 | 5-methyl-7-tert-butyl-4-sulfo-benzoxazol-2-yl-(4-aminophenyl) | " | greenish yellow |
| 74 | 5-tert-butyl-7-methyl-4-sulfo-benzoxazol-2-yl-(4-aminophenyl) | " | greenish yellow |
| 75 | 5-(4-sulfophenyl)-benzoxazol-2-yl-(4-aminophenyl) | " | greenish yellow |

| Example No. | A | B | Shade on Paper |
|---|---|---|---|
| 76 | (benzimidazole-SO3H with phenyl-NH2) | " | greenish yellow |
| 77 | (benzotriazole-SO3H with phenyl-NH2) | " | greenish yellow |
| 78 | (benzofuran-SO3H with phenyl-NH2) | " | greenish yellow |

EXAMPLE 79:

The diazo component used in Example 4 is obtained by repeating Example 1(a), except that the 110 parts of 2-aminophenol are replaced by an equivalent amount of 2-aminophenol-4-sulfonic acid.

The diazo components used in examples 3 to 13 were each obtained by sulfonating the corresponding amines under the conditions stated in Example 1(b).

The sulfo-free amines for the diazo components of Examples 3 to 12 are obtainable in a manner similar to that described in Example 1(a).

The diazo component used in Example 13 is obtainable by sulfonating the corresponding amine under the conditions stated in Example 1(b), and the amine by reducing the corresponding nitro compound under customary conditions.

The nitro compound was prepared by the known reaction of o-hydroxybenzaldehyde with 4-nitrobenzyl bromide.

EXAMPLE 80:

A dye stock solution is prepared by dissolving 1.0 g of the dye compound of Example 1 in 500 ml of water. To 10 ml of this solution is then added a suspension of 4.0 g (dry weight) of bleached sulfite fibers in 300 ml of water, and the suspension is then stirred at room temperature for 10 minutes. A sizing agent consisting of 1.5 ml of 4% tree resin solution and 3 ml of 4% aluminium sulfate solution is then added. The pH value of the dyebath is about 4.5. Stirring is continued for 15 minutes before the colored material is filtered off on a sieve. The paper has a very intense brilliant light-fast yellow shade. The degree of exhaustion is >90%.

What is claimed is:

1. An azo dye of the formula

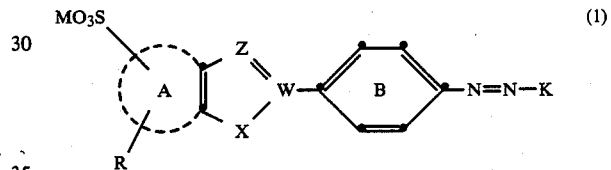

or tautomeric forms thereof, in which:

Z is N or CH,
X is O,
W is C,
K is a coupling component,
R is hydrogen, $C_1$-$C_6$-alkyl, $C_1$-$C_4$-alkoxy, halogen, nitro, —CN, —NHR$_1$, —NH-acyl, phenoxy, —COOH, —COOR$_1$, —CONHR$_1$, phenyl or phenyl which is substituted by $C_1$-$C_4$-alkyl, $C_1$-$C_4$-alkoxy, halogen, nitro or sulfo; wherein acyl is $C_2$-$C_6$-alkanoyl, benzoyl or benzoyl which is substituted by $C_1$-$C_4$-alkyl, $C_1$-$C_4$-alkoxy, halogen, nitro or sulfo; R$_1$ being hydrogen, $C_1$-$C_6$-alkyl, $C_1$-$C_6$-alkyl which is substituted by OH, $C_1$-$C_4$-alkoxy or $C_1$-$C_4$-hydroxyalkoxy, phenyl or phenyl which is substituted by $C_1$-$C_4$-alkyl, $C_1$-$C_4$-alkoxy, halogen, nitro or sulfo,
M is H$^\oplus$, Li$^\oplus$, Na$^\oplus$, K$^\oplus$, NH$_4^\oplus$, or $C_4$-$C_{12}$-trialkylammonium, $C_4$-$C_{12}$-diammonium or $C_2$-$C_{12}$-alkanolammonium,
A is a benzene or pyridine ring which is unsubstituted or substituted by halogen, nitro, —CN, $C_1$-$C_4$-alkoxy or $C_1$-$C_4$-alkyl,
B is a 1,4-phenylene radical which is unsubstituted or substituted by sulfo, $C_1$-$C_4$-alkyl, $C_1$-$C_4$-alkoxy, halogen, nitro or —CN.

2. An azo dye according to claim 1, wherein K is a coupling component from the group consisting of acylacetarylamides, phenols, pyridones, quinolines, pyrazoles, indoles, diphenylamines, anilines, aminopyridines, pyrimidines, pyrimidones, naphthols, naphthylamines, aminothiazoles, thiophenes or hydroxypyridines.

3. An azo dye according to claim 2, wherein K is a compound of the formula

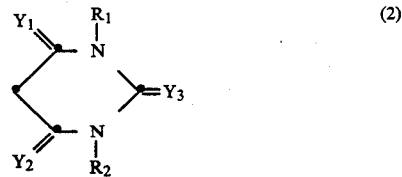

in which
$Y_1$ and $Y_2$ are independently of each other $=O$, $=NH$ or $=N-C_1-C_6$-alkyl,
$Y_3$ is $=O$, $=S$, $=NR_1$ or $=N-CN$ and
$R_1$ and $R_2$ are independently of each other hydrogen, $C_1-C_6$-alkyl, $C_1-C_6$-alkyl which is substituted by OH, $C_1-C_4$-alkoxy or $C_1-C_4$-hydroxyalkoxy, or phenyl which is substituted by $C_1-C_4$-alkyl, $C_1-C_4$-alkoxy, halogen, nitro or sulfo,
or of the formula

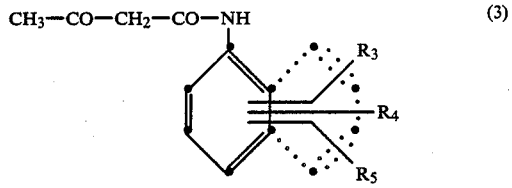

in which $R_3$, $R_4$ and $R_5$ are each independently of one another hydrogen, $C_1-C_4$-alkyl, $C_1-C_4$-alkoxy, chlorine, bromine, nitro or sulfo
or of the formula

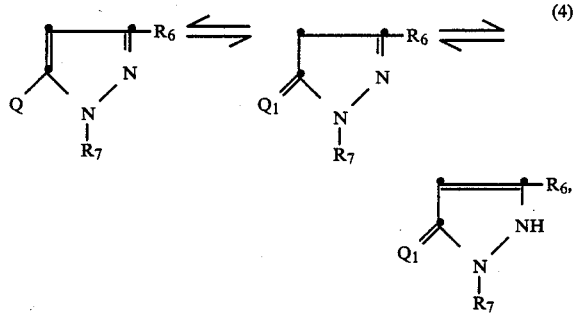

in which Q is OH or $NH_2$, $Q_1$ is O or NH, $R_7$ is H, $C_1-C_4$-alkyl, alkenyl, cycloalkyl, aryl, benzyl or phenylethyl and $R_6$ is $R_7$ or $COOR_7$ or $CONHR_7$.

4. An azo dye according to claim 3, wherein K is a coupling component of the formula (2) in which $R_1$ and $R_2$ are independently of each other hydrogen or $C_1-C_4$-alkyl.

5. An azo dye according to claim 4, wherein K is a coupling component of the formula (2) in which $Y_1$ and $Y_2$ are identical and are each $=O$ or $=NH$.

6. An azo dye according to claim 4, wherein K is a coupling component of the formula (2), in which $Y_3$ is $=O$, $=NH$ or $=N-CN$.

7. An azo dye according to claim 4, wherein K is a coupling component of the formula (2), in which $Y_1$, $Y_2$ and $Y_3$ are each $=O$.

8. An azo dye according to claim 1, wherein R is hydrogen, $C_1-C_6$-alkyl, $C_1-C_4$-alkoxy, NH-acyl wherein acyl has the meaning given in claim 1, or sulfophenyl.

9. An azo dye according to claim 8, wherein R is hydrogen, $C_1-C_4$-alkoxy or $C_1-C_4$-alkyl.

10. An azo dye according to claim 9, wherein R is hydrogen, methoxy or methyl.

11. An azo dye according to claim 1, wherein Z is N.

12. An azo dye according to claim 1, wherein A is a benzene radical which is not further substituted, X is O, Z is N and R is hydrogen.

13. An azo dye according to claim 1, wherein the 1,4-phenylene radical B is not further substituted.

14. An azo dye of the formula (1) according to claim 1, in which R is hydrogen, $C_1-C_4$-alkyl or $C_1-C_4$-alkoxy, X is O, Z is N, and K is a radical of the formula (2) where $R_1$ and $R_2$ are independently of each other hydrogen or $C_1-C_4$-alkyl, $Y_1$ and $Y_2$ are identical and are each $=O$ or $=NH$, $Y_3$ is $=O$, $=NH$ or $=N-CN$, M is $H^\oplus$, $Na^\oplus$, $K^\oplus$, $NH_4^\oplus$ or $C_2-C_6$-alkanolammonium, A is a benzene radical and B is a 1,4-phenylene radical which is unsubstituted or substituted by sulfo, chlorine, methoxy or methyl.

15. An azo dye according to claim 14, in which R is hydrogen, $C_1-C_4$-alkyl or $C_1-C_4$-alkoxy, X is O, W is CH, Z is N and K is a coupling component of the formula (2) where $R_1$ and $R_2$ are H, $Y_1$ and $Y_2$ are each $=O$ and $Y_3$ is $=O$ or $=N-CN$, M is $Li^\oplus$, $Na^\oplus$ or protonated $C_4-C_6$-alkanolammonium, A is a benzene radical and B is a 1,4-phenylene radical which are not further substituted.

16. An azo dye according to claim 1 of the formula

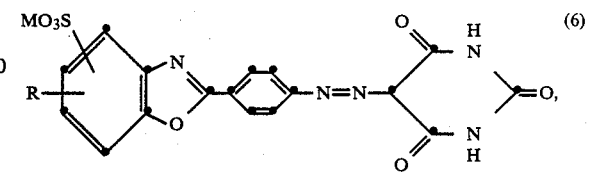

* * * * *